United States Patent

[11] 3,566,925

| [72] | Inventors | Hideo Sagara;<br>Tomoyuki Mashimo; Takeshi Kifune,<br>Hiroshima, Japan |
|---|---|---|
| [21] | Appl. No. | 798,679 |
| [22] | Filed | Feb. 12, 1969 |
| [45] | Patented | Mar. 2, 1971 |
| [73] | Assignee | Mitsubishi Jukogyo Kabushiki Kaisha<br>Toyko, Japan |

[54] SPIRAL MULTILAYER PIPE FOR PRESSURE VESSEL
4 Claims, 4 Drawing Figs.

[52] U.S. Cl. .................................................. 138/143,
138/144, 138/151, 138/171
[51] Int. Cl. ............................................... F16l 9/14
[50] Field of Search .......................................... 138/143,
144, 150, 151, 170, 171, 165; 220/3, 83

[56] References Cited
UNITED STATES PATENTS

| 662,345 | 11/1900 | Britton et al. | 138/177X |
|---|---|---|---|
| 3,092,148 | 6/1963 | Carstens | 138/143X |
| 3,293,860 | 12/1966 | Stedfeld | 220/3X |
| 3,461,917 | 8/1969 | Uto et al. | 138/143 |
| 3,478,784 | 11/1969 | Wollfer | 138/171X |

Primary Examiner—Herbert F. Ross
Attorney—George B. Oujevolk

ABSTRACT: A spiral multilayer pipe for a pressure vessel characterized in that a plurality of steel sheets which are thinner than a hoop steel constituting the main spiral body and are different in length, said steel sheets being secured to at least one of the hoop steel ends so as to form the end into wedged shape.

PATENTED MAR 2 1971  3,566,925

Hideo Sagara
Tomoyuki Mashimo
Takeshi Kifune
INVENTORS

BY George B. Oujevolk
Attorney

SPIRAL MULTILAYER PIPE FOR PRESSURE VESSEL

BACKGROUND OF THE INVENTION

This invention relates to a spiral multilayer pipe for a pressure vessel suitably used for chemical plants, atomic power plants, etc.

In the manufacture of such spiral multilayer pipes for a pressure vessel, a certain length of hoop steel is wound around an inner cylinder, each end of the hoop steel being formed in wedged shape either by shaving the hoop steel itself or by welding wedge piece to the end of the hoop. However, since such wedge portions must usually have a length greater than the radius of the inner cylinder, the machining or the like operation to provide such wedges requires much time and cost. In addition, prebending of the hoop end at the beginning of the winding operation must be carefully performed so as to fit the hoop end closely to the contour of the inner cylinder.

SUMMARY OF THE INVENTION

An object of the present invention is to eliminate these disadvantages of conventional spiral multilayer pipes and to provide a spiral multilayer pipe which is simple to manufacture and can well meet the requirement of its applications.

A characteristic of the present invention is that a spiral multilayer pipe for a pressure vessel comprising a plurality of steel sheets which are thinner than a hoop steel constituting the main spiral body and are different in length, said steel sheets being secured to at least one of the hoop steel ends so as to form it into wedged shape.

The invention will be described herebelow in more detail with reference to the accompanying drawing illustrating a preferred embodiment.

DESCRIPTION OF THE PREFERRED EMBODIMENTS

Figure 1:
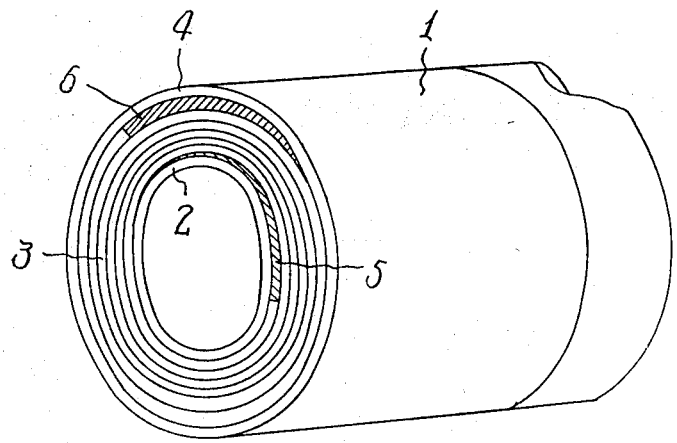
FIG. 1 is a fragmentary perspective view of a spiral multilayer body of a pressure vessel used for ammonia converter, embodying the present invention.

In the drawing, a multilayer pipe according to the present invention is shown as consisting of a multilayer body 1, an inner cylinder 2, a spiral hoop 3, an outer cylinder 4, a wedge 5 at the inner end of the spiral hoop, and a wedge 6 at the outer end of the spiral hoop. Reference numerals 7, 8, 9 and 10 indicate steel sheets that are laminated to form the wedge 5 at one end.

Letter A designates beveled ends of the steel sheets 7, 8, 9, 10 and hoop 3. The sheets 7 to 10 are welded to the hoop 3 at 11. Reference numeral 12 indicates weld portion of ends of said sheets. As shown, each of the laminated sheets has a thickness one-fifth of the hoop and a length, which is several times longer than its thickness, varying in arithmetical progression from adjacent sheets, so that a wedge piece 5 may be formed by means of placing one sheet upon another.

The wedge 6 at the outer end is formed in the same manner as the wedge 5.

Figure 2:
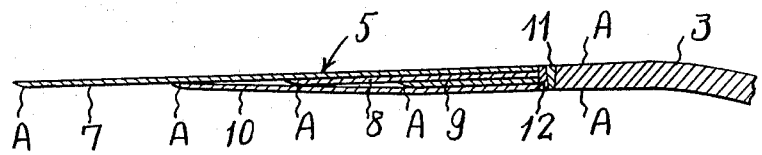
FIG. 2 is a detailed view of the end portion of a hoop steel that constitutes the main part of the above body.

Since both wedges 5 and 6 are formed alike, the description hereunder will be made specifically in connection with the wedge 5. As indicated at 5 in FIG. 1, the wedge at one end of the hoop 3 is sandwiched between the spiraled multiple layers of hoop 3 and the inner cylinder 2 in such a manner that the longest sheet 7 faces on the inmost layer of the hoop 3 to prevent the spring-back of the tipes of sheets 7 to 10. Formed of the steel sheet 7 to 10 each having a thickness of one-fifth that of the hoop 3, the wedge 5 is so flexible that it can fit closely to the mating wall surface of the inner cylinder without being curled beforehand and will not slip because it withstands circumferential stress that is exerted on the spiral hoop 3 due to frictional force on the surface produced by the fastening force of the spiral layers as a whole. As described above and shown in FIG. 2, the wedge piece 5 consists of sheets of different lengths, one placed upon another stepwise and in such a manner that shorter sheets 8 and 9 thereof lie between longer sheets 7 and 10, and a slight wedgelike space is provided between the wedge piece and the hoop 3 on account of smaller thickness of the wedge.

Figure 3:
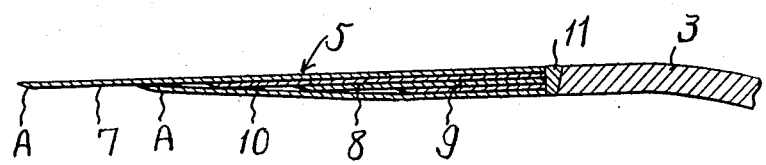
FIG. 3 and FIG. 4 are other embodiments of the end portion of a hoop steel shown in FIG. 2.
Figure 4:
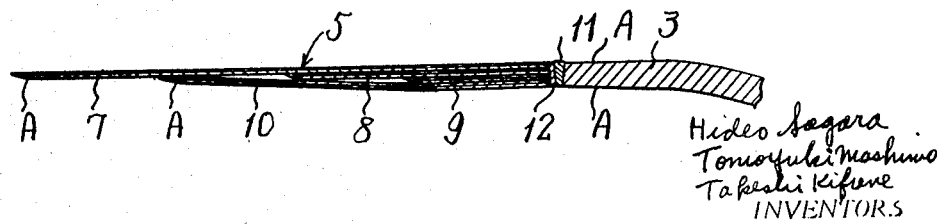

However, generally rounded edges A of the steel sheets 7 and 10 and of the hoop 3 permit the wedge to fit stably to the mating surface without exerting any excessive pressure against its opposite part and thus the wedge can adequately retain frictional force as above described. To secure the steel sheets 7, 8, 9 and 10 to the hoop end, the former may be welded one by one to the latter. As an alternative, it is possible to weld directly an end of the hoop 3 to the wedge piece arranged in such a manner that the sheet 7 to 10 are laminated altogether upon the procedure aforesaid and the straight edges of all sheets confronting with the end of hoop 3 are welded to one another. In the latter case, the welding operation must be carefully performed and inspected after it has been done because the welded effect is to transmit the frictional force of the wedge 5 to the end of hoop 3. While in the embodiment shown in FIG. 2, the wedge laminate consists of four steel sheets, each having one-fifth thickness of the hoop 3, and the sheet 7 is stepped from the welded end of hoop 3, it is also possible to arrange the sheet 7 on the flush level with the hoop 3. Further, five sheets may be laminated together, so that the end of the wedge piece secured with the hoop 3 may have the same thickness as that of the hoop 3 and the outmost sheets 7 and 10 thereof may be arranged on the flush levels with the hoop 3 (see FIG. 3). In any case the wedge functions equally provided that it consists of se steel sheets of different lengths laminated in stepped arrangement and secured altogether to one end of a hoop, with the step corners being beveled or rounded. While each wedge in the embodiment shown is composed of steel sheets of different lengths placed one upon another, it is possible, where necessary, to form unit sheets from two or more thinner steel sheets of substantially the same length and laminate a plus plurality of such unit sheets to constitute a wedge in the manner as above described (see FIG. 4).

As described in detail above, the multilayer pipe according to the present invention contains wedges each consisting of a plurality of steel sheets which are thinner than the hoop constituting the main pipe body and are different in length, said wedge being secured to both ends of the hoop as spiral ends thereof. However, in the event that a multilayer pipe be composed of a sole spiral hoop and an inner cylinder without having an outer cylinder, one wedge piece alone according to the invention may be used advantageously to fill up a space between the inner cylinder and the inmost layer of the hoop.

Thus compared with the conventional procedure of wedging the hoop ends of spiral multilayer pipes by diagonally shaving off the hoop ends themselves so as to form integral wedged edges, the present invention makes it possible to save considerable labor and time required for their machining and also to render the wedges sufficiently flexible for close fitting to the mating cylinder surfaces.

We claim:

1. A spiral multilayer pipe for a pressure vessel comprising a hoop steel main spiral body, a plurality of short steel sheets secured to and extending from at least one end of said spiral body, said steel sheets being of different lengths, whereby said one end of the spiral body presents a wedge shape overlying said hoop.

2. A spiral multilayer pipe for a pressure vessel according to claim 1 wherein said steel sheets have a beveled or rounded edge.

3. A spiral multilayer pipe for a pressure vessel according to claim 1 wherein said steel sheets are laminated stepwise and in such a manner that shorter sheets thereof may lie between longer sheets.

4. A spiral multilayer pipe for a pressure vessel according to claim 1 wherein the outermost steel sheet is the longest.